United States Patent

Cot et al.

[11] Patent Number: 5,494,221
[45] Date of Patent: Feb. 27, 1996

[54] VARIABLE GEOMETRY TURBOJET ENGINE EXHAUST NOZZLE

[75] Inventors: Fabrice M. O. Cot, Savigny le Temple; Guy J.-L. Lapergue, Rubelles, both of France

[73] Assignee: Societe Nationale D'Etude et de Construction de Moteurs D'Aviation (S.N.E.C.M.A.), Paris, France

[21] Appl. No.: 375,477

[22] Filed: Jan. 19, 1995

[30] Foreign Application Priority Data

Jan. 20, 1994 [FR] France .................................. 94 00573

[51] Int. Cl.⁶ .................................................. F02K 1/12
[52] U.S. Cl. .................. 239/265.19; 239/265.41; 60/230
[58] Field of Search ........... 234/265.19, 265.33–265.35, 234/265.37, 265.39, 265.41; 60/228, 230, 232, 271

[56] References Cited

U.S. PATENT DOCUMENTS

| | | | |
|---|---|---|---|
| 2,969,641 | 1/1961 | Schaefer | 239/265.37 X |
| 3,024,600 | 3/1962 | Sollinger . | |
| 3,098,352 | 7/1963 | Taub | 239/265.37 X |
| 4,245,787 | 1/1981 | Freid | 239/265.41 |
| 4,778,109 | 10/1988 | Jourdain et al. | 239/265.27 |
| 4,892,254 | 1/1990 | Schneider et al. | 239/265.41 |
| 5,076,496 | 12/1991 | Lippmeier | 239/265.41 |
| 5,082,182 | 1/1992 | Bruchez | 239/265.39 X |
| 5,328,098 | 7/1994 | Barcza et al. | 60/230 X |
| 5,335,489 | 8/1994 | Thayer | 60/230 |
| 5,351,888 | 10/1994 | Taylor et al. | 60/332 X |

FOREIGN PATENT DOCUMENTS

| | | | |
|---|---|---|---|
| 091786 | 10/1983 | European Pat. Off. . | |
| 1225736 | 2/1960 | France . | |
| 2602274 | 2/1988 | France . | |
| 2608680 | 6/1988 | France . | |
| 792962 | 4/1958 | United Kingdom | 239/265.34 |
| 2256007 | 11/1992 | United Kingdom . | |
| 2272945 | 1/1994 | United Kingdom | 239/265.41 |

*Primary Examiner*—Kevin P. Weldon
*Attorney, Agent, or Firm*—Bacon & Thomas

[57] ABSTRACT

A variable geometry exhaust nozzle for a turbojet engine is disclosed having an array of outer flaps and an array of inner flaps radially spaced apart and extending about a central axis of the exhaust duct structure. The array of outer flaps comprises a plurality of outer flaps each having an upstream end pivotally attached to the engine duct structure. The array of inner flaps comprises a plurality of upstream inner flaps, each having an upstream edge pivotally attached to the engine duct structure and a plurality of downstream inner flaps each having an upstream edge portion pivotally attached to a downstream edge portion of a corresponding upstream inner flap. A control annulus is movably attached to the engine structure so as to be movable axially along the central axis and is connected to an actuator which moves the control annulus between upstream and downstream limit positions along the central axis. The control annulus is connected to the upstream and downstream inner flaps such that the axial components of the forces exerted by the control annulus on the connections to the upstream and downstream inner flaps extend in opposite directions. The control annulus is also connected to the outer flap such that the axial component of the force exerted by the control annulus on the outer flap during flap movement extends in the same direction as does the axial component of the force exerted by the control annulus on the upstream inner flap connection. Since the axial components of the forces are in opposite directions, the actuator need only exert a minimal force on the control annulus to vary the positions of the flaps.

10 Claims, 3 Drawing Sheets

5,494,221

VARIABLE GEOMETRY TURBOJET ENGINE EXHAUST NOZZLE

BACKGROUND OF THE INVENTION

The present invention relates to a turbojet engine exhaust nozzle having a variable geometry.

Modern jet aircraft, which are often required to carry out sub-sonic as well as supersonic flights, may be equipped with an afterburner in the exhaust gas duct upstream of the exhaust nozzle. In turbojet engines without afterburners, the nozzle may be either of a fixed, or a variable geometry type wherein the cross-section of the exhaust nozzle may be varied. However, afterburner equipped turbojet engines must be able to operate either with or without afterburning, depending upon the flight conditions. The cross-sections of the nozzle are quite different for the two operational configurations and, hence, nozzles on such turbojet engines must be of the variable cross-section type.

The first variable cross-section nozzles comprised a variable position convergent segment in which the cross-sectional configuration was easily adjusted as a function of the flight conditions. Presently, in order to achieve higher thrust than may be obtained from a variable converging segment nozzle, the nozzles must have a variable cross-section converging-diverging structure. However, such variable geometry converging-diverging nozzles typically entail complex kinematics and add a significant amount of weight to the aircraft structure.

French Patent No. 1,225,736 discloses a typical structure for a variable geometry converging-diverging nozzle. The controls for the upstream and downstream movable flaps comprise hydraulic actuators axially displacing annuli connected by link rods, or by hinging systems to the flaps, the outer-ring flaps being connected to the inner-ring flaps by link rods. This control system requires two control loops, but each set of actuators must generate sufficient forces to compensate for the pressures exerted by the exhaust gases on the movable flaps. Accordingly, the control means of this type of nozzle are complex and comparatively heavy.

SUMMARY OF THE INVENTION

A variable geometry exhaust nozzle for a turbojet engine is disclosed having an array of outer flaps and an array of inner flaps radially spaced apart and extending about a central axis of the exhaust duct structure. The array of outer flaps comprises a plurality of outer flaps each having an upstream end pivotally attached to the engine duct structure. The array of inner flaps comprises a plurality of upstream inner flaps, each having an upstream edge pivotally attached to the engine duct structure and a plurality of downstream inner flaps each having an upstream edge portion pivotally attached to a downstream edge portion of a corresponding upstream inner flap. A control annulus is movably attached to the engine structure so as to be movable axially along the central axis and is connected to an actuator which moves the control annulus between upstream and downstream limit positions along the central axis. The control annulus is connected to the upstream and downstream inner flaps such that the axial components of the forces exerted by the control annulus on the connections to the upstream and downstream inner flaps extend in opposite directions. The control annulus is also connected to the outer flap such that the axial component of the force exerted by the control annulus on the outer flap during flap movement extends in the same direction as does the axial component of the force exerted by the control annulus on the upstream inner flap connection. Since the axial components of the forces are in opposite directions, the actuator need only exert a minimal force on the control annulus to vary the positions of the flaps.

By having the axial components of the forces acting on the control annulus extending in opposite directions, the actuator need only exert a force on the control annulus sufficient to overcome the resultant axial component, thus allowing the actuators to be smaller and, consequently, lower in weight than the control systems of the known nozzles.

The nozzle according to the present invention comprises a single annular control means located between the outer flap ring and the inner flap ring, the control means being axially displaceable by a plurality of actuators present between the stationary turbojet engine structure and the control means. The control means is connected by respective connecting means to the controlled upstream inner flaps, the controlled downstream inner flaps and to the controlled outer flaps. The respective connecting means allows the configuration of the nozzle to change as a function of the axial position of the control annulus of the control means. The connection means of the controlled upstream inner flaps and the connection means for the controlled downstream inner flaps are arrayed in such a manner that the axial components of the forces exerted by the control means are in opposite directions. Moreover, only one control loop is now utilized by the present invention.

Preferably, the connection means of the controlled upstream inner flaps apply to the flaps a force with an axial component directed toward the front or the upstream direction of the turbojet engine while the connection means for the controlled downstream inner flaps exert a force with an axial component directed in the rearward or downstream direction.

The connection means between the controlled upstream inner flaps and the control annulus may comprise cams rigidly attached to the flaps and follower rollers attached to the control annulus such that the rollers engage the cams. The connection means for the controlled downstream inner flaps may comprise link rods pivotally attached to the control annulus and to the controlled flaps. The controlled outer flaps are connected to the control annulus by a cam device which may comprise a control cam fixedly attached to the outer flap and a follower roller attached to the control annulus and engaging the cam on the outer flap.

The control annulus may comprise upstream and downstream collars interconnected by longitudinal beam members to which are also attached the movable portions of the actuators. The cam follower for the upstream, inner flap actuation may be connected adjacent to the upstream collar, while the link interconnecting the control annulus to the downstream inner flap may be pivotally connected adjacent to the downstream collar.

DETAILED DESCRIPTION OF THE PREFERRED EMBODIMENT

Figure 1:
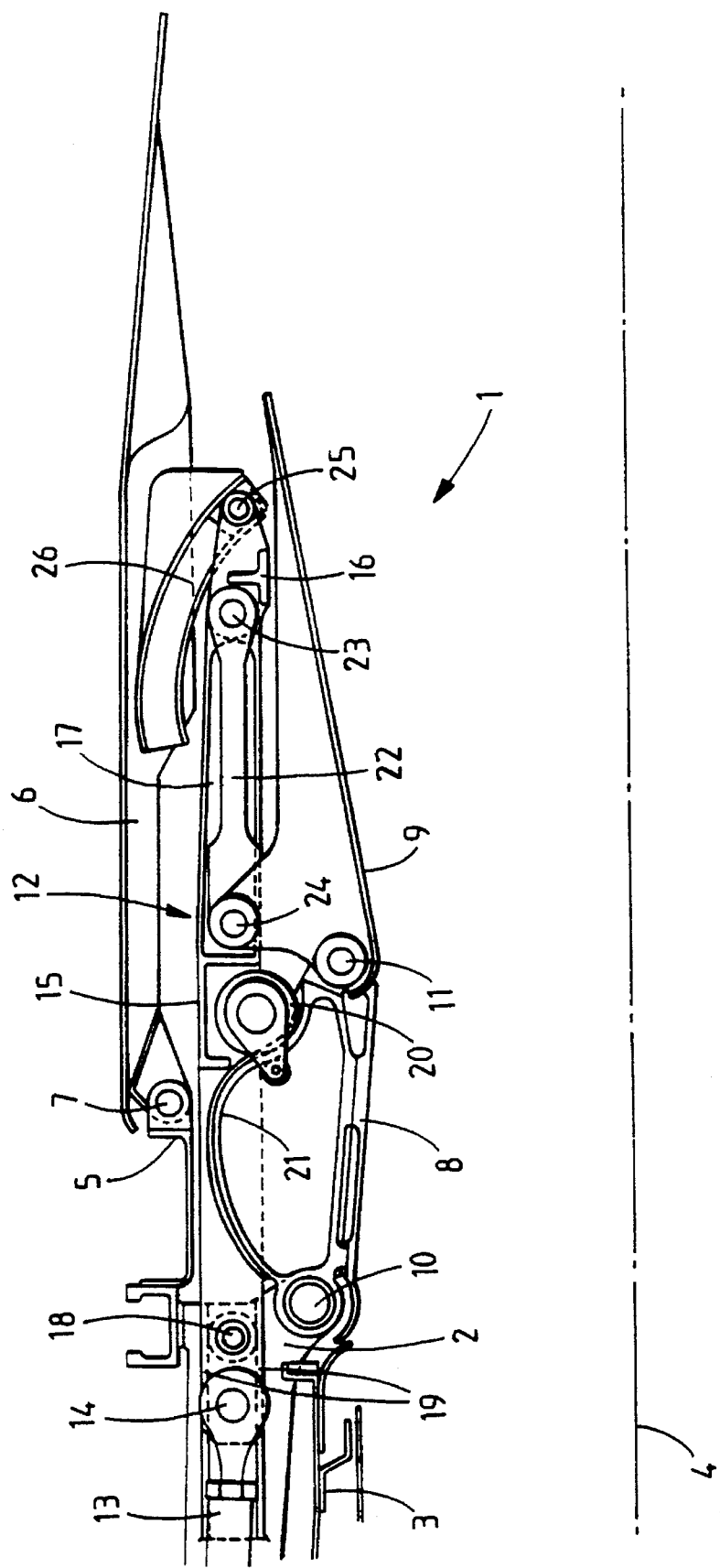
FIG. 1 is a partial, cross-sectional view of a variable geometry nozzle according to the present invention in a maximum throat cross-sectional configuration.
Figure 2:
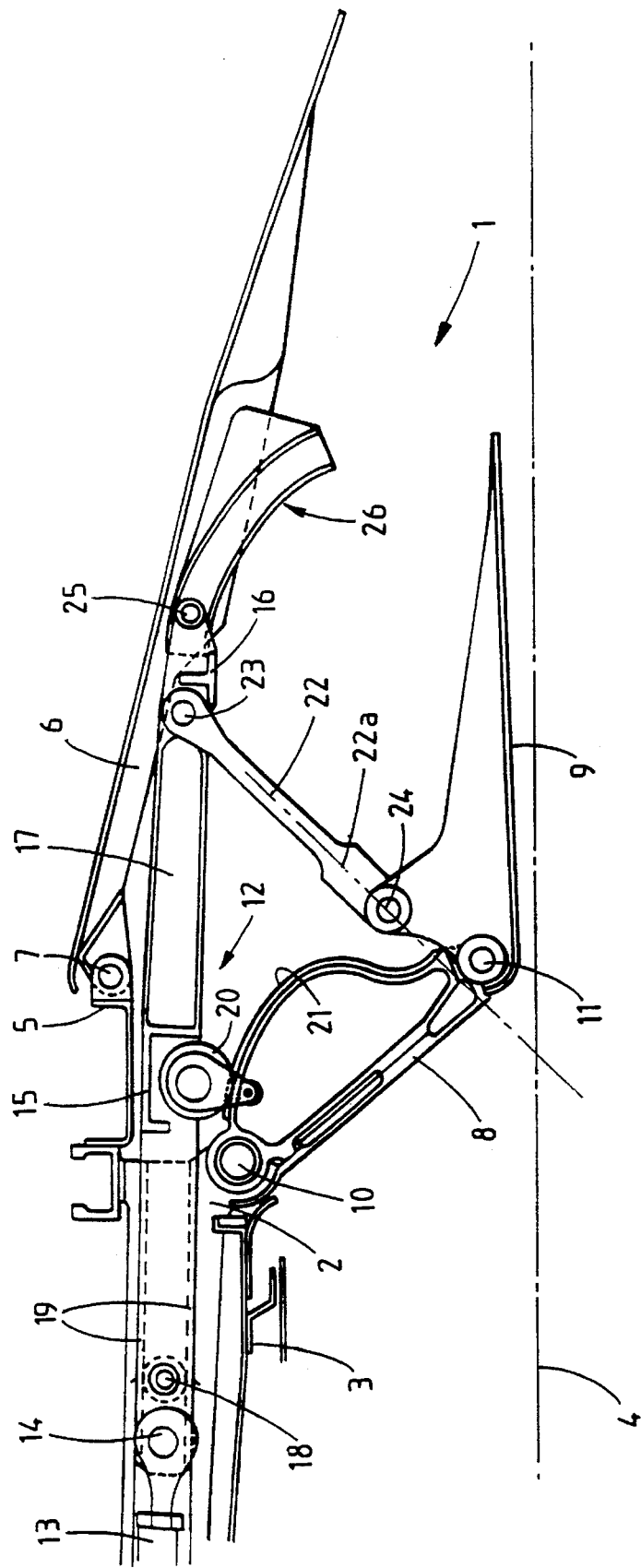
FIG. 2 is a view similar to FIG. 1 illustrating the nozzle in a minimum throat cross-sectional configuration.

The axially symmetrical exhaust nozzle 1 of the present invention is schematically illustrated in FIGS. 1 and 2 and comprises an engine structure 2 of generally annular configuration enclosing a nozzle shroud 3 which forms an extension of an outer annular wall bounding an exhaust duct issuing from the engine or the afterburner (not shown). The engine structure 2 and the nozzle shroud 3 comprise the stationary end portion of the turbojet engine and extend about a central axis 4.

An annular cowling support 5 is connected to the engine structure 2 and is disposed axially downstream (towards the right as illustrated in FIGS. 1 and 2) and radially outside of the engine structure 2. An array of outer or cold flaps 6 is mounted downstream of the cowling support 5 and comprises a plurality of cold flaps 6 each having an upstream edge portion pivotally attached to the cowling support 5 via pivot shafts 7. As illustrated, the outer flaps 6 pivot about the shafts 7 which extend generally perpendicular to the central axis 4.

An array of inner flaps is disposed radially inwardly of the array of outer flaps 6 and disposed about the central axis 4, the array of inner flaps comprising a plurality of upstream inner flaps 8 each having an upstream edge portion pivotally attached to the engine structure 2 by pivot shafts 10 and having a downstream edge portion. A plurality of downstream inner flaps 9 each has an upstream edge pivotally attached to the downstream edge of a corresponding upstream inner flap 8 by a pivot shaft 11. The array of outer, or cold, flaps 6 and the array of inner flaps 8 and 9 comprise, in known fashion, annular arrays of controlled flaps circumferentially interconnected by intermediate, follower flaps. This structure is well known in the art and a detailed description need not be given here. Reference numerals 6, 8 and 9 hereinafter denote the controlled flaps of each of the annular arrays.

A control annulus 12 is located in the annular space between the inner and outer flap arrays and is attached to the engine structure 2 so as to be movable in a direction substantially parallel to the central axis 4 between an upstream limit position (illustrated in FIG. 2) and a downstream limit position (illustrated in FIG. 1). The control annulus 12 is moved by connection with actuators 13, which may comprise hydraulic actuators having a cylinder and a movable piston rod connected to the control annulus 12 via hinge 14.

The control annulus 12 comprises an upstream collar 15 and a downstream collar 16 interconnected to each other by longitudinal beam members 17 which prevent collars 15 and 16 from twisting. The longitudinal beam members 17 extend in an upstream direction (towards the left as illustrated in FIGS. 1 and 2) from the upstream collar 15 and are connected to the hydraulic actuators 13 by hinge 14. Movement of the control annulus 12 is axially guided by rollers 18 attached to either side of an upstream portion of the longitudinal beam member 17 which rolls on rails 19 affixed to the nozzle structure 2. Rollers 18 absorb the radial component of the forces applied by the actuators 13 resulting from the inclination of the actuators relative to the central axis 4.

The connection between the control annulus 12 and the controlled upstream inner flaps 8 comprises follower rollers 20 mounted on the upstream collar 15 engaged with a cam 21 fixedly attached to controlled the upstream inner flaps 8.

The connection between the control annulus 12 and the controlled downstream inner flaps 9 comprises link rods 22 pivotally attached to the control annulus 12 adjacent to the downstream collar 16 by pivot shaft 23 and pivotally connected to the downstream inner flap 9 by pivoting fastener 24.

The connection between the control annulus 12 and the control outer flaps 6 comprises follower rollers 25 attached to the downstream ends of the longitudinal beam members 17 which engage a cam track 26 fixedly attached to the controlled outer flap 6.

The link rods 22 are slanted towards the central axis 4 from the control annulus 12 such that the axis 22a between the connecting points 23 and 24 extends upstream of the pivot shaft 11 connecting the downstream inner flaps 9 to the upstream inner flaps 8, as illustrated in FIG. 2. The force exerted by the pressure P of the exhaust gases on the downstream inner flaps 9 is compensated by a force T from the link rods 22. The axial component Ta of the traction force T extends in a downstream direction, as illustrated in FIG. 3.

On the other hand, the follower rollers 20 apply a compressive force C pointing towards the central axis 4 on the cams 21 attached to the upstream inner flaps 8. The axial component Ca of this compressive force points in an upstream direction, as illustrated in FIG. 3.

As a result of axial components Ta and Ca pointing in opposite directions, the axial force Fa required from the actuators 13 equals the difference between the axial components Ca and Ta plus the axial component Ea of force E required to move the outer flap 6. This force Fa may be comparatively slight during some flight conditions, depending upon the axial position of the control annulus 12.

Figure 3:
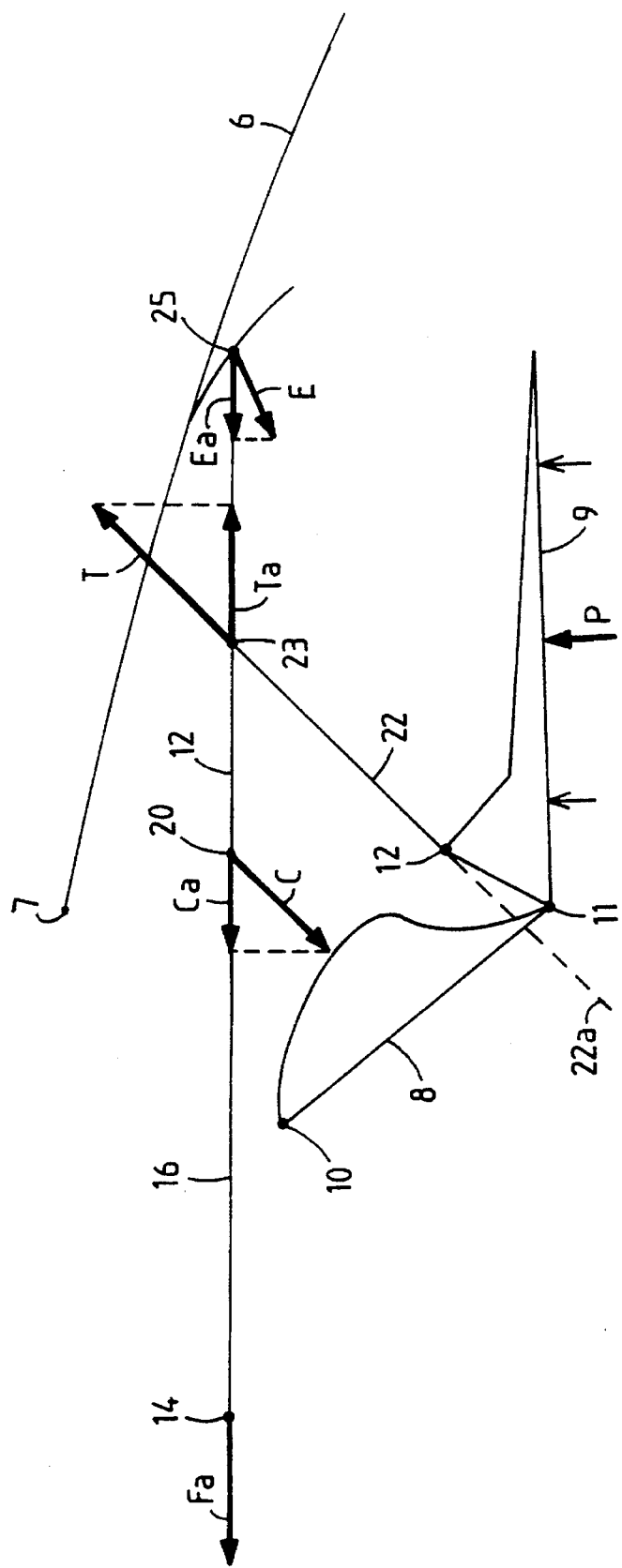
FIG. 3 is a schematic diagram of the forces exerted by the control means on the controlled flaps of the nozzle according to the present invention.

FIG. 3 diagrammatically illustrates the forces exerted by the controlled annulus 12 on the connections between the control annulus and the various controlled flaps 6, 8 and 9. The force Fa is a resultant of the axial forces (Ca+Ea)–Ta.

Because of the kinematics utilized by the present invention, the actuators 13 may be comparatively smaller and, hence lighter, than the actuators in the known variable geometry nozzles.

The foregoing description is provided for illustrative purposes only and should not be construed as in any way limiting this invention, the scope of which is defined solely by the appended claims.

We claim:

1. A variable geometry exhaust nozzle for a turbojet engine having a structure bounding an exhaust duct extending about a central axis through which gases pass in an upstream to downstream direction and comprising:

a) a first array of outer flaps extending about the central axis and comprising a plurality of outer flaps each having an upstream end portion pivotally attached to the engine structure;

b) a second array of inner flaps extending about the central axis and located radially inwardly of the outer flaps, the second array comprising:
      i) a plurality of upstream inner flaps, each having an upstream edge portion pivotally attached to the engine structure and having a downstream edge portion; and,
      ii) a plurality of downstream flaps, each having an upstream edge portion pivotally attached to the downstream edge portion of an upstream inner flap;

c) a control annulus movably attached to the engine structure so as to be movable along the central axis;

d) actuating means connected to the engine structure and to the control annulus so as to move the control annulus between upstream and downstream limit positions; and, e) connecting means comprising first connector means connecting at least one upstream inner flap to the control annulus and second connector means connecting at least one downstream inner flap to the control annulus such that axial movement of the control annulus changes the geometry of the exhaust nozzle whereby the axial component of the force exerted by the control annulus on the first connection means extends in an opposite direction to the axial component of the force exerted by the control annulus on the second connector means.

2. The variable geometry exhaust nozzle of claim 1 further comprising third connector means connecting at least one outer flap to the control annulus such that an axial component of the force exerted by the control annulus on the third connector means extends in the same direction as the axial component of the force exerted by the control annulus on the first connector means.

3. The variable geometry exhaust nozzle of claim 1 wherein the control annulus is located in an annular space between the first and second arrays of flaps.

4. The variable geometry exhaust nozzle of claim 1 wherein the first connector means comprises:
   a) a first cam affixed to one of said plurality of said inner flaps; and
   b) a first cam follower contacting the first cam and affixed to the control annulus.

5. The variable geometry exhaust nozzle of claim 4 wherein the cam follower comprises a roller.

6. The variable geometry exhaust nozzle of claim 1 wherein the second connector means comprises a link rod pivotally attached to the control annulus and to one of said plurality of inner flaps.

7. The variable geometry exhaust nozzle of claim 2 wherein the third connector means comprises:
   a) a second cam affixed to one of said plurality of said outer flaps; and,
   b) a second cam follower engaging the second cam and affixed to said control annulus.

8. The variable geometry exhaust nozzle of claim 7 wherein the second cam follower comprises a roller.

9. The variable geometry exhaust nozzle of claim 1 wherein the control annulus comprises:
   a) a first, upstream collar;
   b) a second, downstream collar; and,
   c) a plurality of longitudinal members interconnecting the upstream and downstream collars.

10. The variable geometry exhaust nozzle of claim 9 wherein the first connector means is connected to the first, upstream collar and the second connector means is connected to the second, downstream collar.

\* \* \* \* \*